(12) United States Patent
Cox et al.

(10) Patent No.: US 8,484,693 B2
(45) Date of Patent: Jul. 9, 2013

(54) EFFICIENT POLICY CONFLICT DETECTION

(76) Inventors: Gregory W. Cox, Schaumburg, IL (US);
David L. Raymer, Watauga, TX (US);
John C. Strassner, North Barrington, IL (US)

( * ) Notice: Subject to any disclaimer, the term of this patent is extended or adjusted under 35 U.S.C. 154(b) by 1406 days.

(21) Appl. No.: 11/741,141

(22) Filed: Apr. 27, 2007

(65) Prior Publication Data

US 2008/0271111 A1    Oct. 30, 2008

(51) Int. Cl.
*G06F 21/00* (2006.01)

(52) U.S. Cl.
USPC .............................................. 726/1; 726/13

(58) Field of Classification Search
USPC .......................................... 726/1, 13
See application file for complete search history.

(56) References Cited

U.S. PATENT DOCUMENTS

| | | | |
|---|---|---|---|
| 5,889,953 | A | 3/1999 | Thebaut et al. |
| 6,327,618 | B1 | 12/2001 | Ahlstrom et al. |
| 6,473,851 | B1 | 10/2002 | Plutowski |
| 6,651,191 | B1 | 11/2003 | Vacante et al. |
| 7,441,022 | B1 | 10/2008 | Schuba et al. |
| 2004/0117407 | A1* | 6/2004 | Kumar et al. ................. 707/200 |
| 2004/0153875 | A1 | 8/2004 | Amyot et al. |
| 2004/0177139 | A1 | 9/2004 | Schuba et al. |
| 2004/0225927 | A1 | 11/2004 | Warpenburg et al. |
| 2005/0172015 | A1 | 8/2005 | Rana et al. |
| 2005/0276262 | A1* | 12/2005 | Schuba et al. ................. 370/389 |

FOREIGN PATENT DOCUMENTS

| | | |
|---|---|---|
| GB | 2399725 | 9/2004 |
| KR | 1020030050619 A1 | 6/2003 |
| WO | WO 03/084130 A1 | 10/2003 |

OTHER PUBLICATIONS

Yuan et al., FIREMAN: A Toolkit for FIREwall Modeling and Analysis, Proceedings of the 2006 IEEE Symposium on Security and Privacy (S&P'06) 1081-6011/06.*
International Search Report dated Aug. 18, 2008 for International Application No. PCT/US2008/060967.
Jung Jin Kim, "Corresponding Application PCT/US2008/060967—PCT International Search Report and Written Opinion," WIPO, ISA/KR, Korean Intellectual Property Office, Daejeon, Republic of Korea, Aug. 18, 2008, 9 pages, most relevant pp. 6, 8-9.

* cited by examiner

*Primary Examiner* — Brandon Hoffman
*Assistant Examiner* — Thomas C Lauzon

(57) ABSTRACT

A method and computer program product for detecting a policy conflict in a managed system includes examining a plurality of policy rules for overlapping policy targets, in response to finding no overlapping policy targets, reporting that the policy rules do not conflict, and in response to finding overlapping policy targets, examining the plurality of policy rules for at least two rules having a same condition and a same event, and, in response to not finding at least two rules having a same condition and a same event, reporting that the policy rules do not conflict.

4 Claims, 4 Drawing Sheets

EFFICIENT POLICY CONFLICT DETECTION

FIELD OF THE INVENTION

This invention relates in general to policy-based network management, and more specifically to efficiently detecting policy conflicts through use of a multi-level conflict detection procedure.

BACKGROUND OF THE INVENTION

A "policy" is a set of rules that are used to manage and control the changing and/or maintaining of the state of one or more managed object or entities. Policy rules comprise events, conditions and actions. Policy events trigger the evaluation of policy conditions that may lead to the execution of policy actions.

Policy-based network management (PBNM) controls the state of the system and objects within the system using policies. Control is implemented using a management model, such as a finite state machine. It includes installing and deleting policy rules as well as monitoring system performance to ensure that the installed policies are working correctly. PBNM is concerned with the overall behavior of the system and adjusts the policies that are in effect based on how well the system is achieving its goals as expressed in the policy rules.

In a policy-based network of significant size, such as a converged-services wireless network offering seamless mobility, there will be a very large number of policies at different levels of the policy continuum to support and govern the complex operations of the system. The involvement of multiple constituencies at multiple continuum levels introduces the possibility that policies can conflict with each other. However, since policies are potentially complex combinations of events, conditions, and actions, their conflicts may not be easily detected and may be a function of the state of the managed system. Such complexity introduces serious concern as to the level of resources needed to detect conflicts. Although, in the face of such complexity, multiple means of conflict detection are warranted, the prior-art does not offer a solution to efficiently determine which policies are in conflict with each other.

Therefore, a need exists to overcome the problems with the prior art as discussed above.

SUMMARY OF THE INVENTION

A method and system are disclosed for detecting a policy conflict in a managed system, where the method comprises examining a plurality of policy rules for overlapping policy targets and, in response to no policy target overlaps being determined, reporting that the plurality of policy rules do not conflict.

In accordance with an added feature, the present invention includes determining that if a set of conditions and a set of events for the policy rules are not simultaneously satisfied, then there is definitively no conflict in the plurality of policies.

In accordance with an additional feature, in response to the conditions and events for the policy rules being simultaneously satisfied, the invention includes performing additional tests to determine if a conflict does exist.

In accordance with yet another feature, the present invention includes applying the plurality of policy rules to at least one of a model and an actual instance of a real system, comparing one or more macro states that result from the applying of the plurality of policy rules, and, in response to determining a difference between the at least two macro states, reporting that the plurality of policy rules conflict.

In accordance with yet a further feature, the present invention includes, in response to determining that there is no difference between the at least two resulting macro states, applying the plurality of policy rules to a system model, comparing the micro states that result from the applying of the policy rules, and, in response to determining a difference between the at least two micro states, reporting that the plurality of policy rules conflict.

In accordance with an additional feature, the present invention includes, in response to determining that there is no difference between the at least two micro states, reporting that plurality of policy rules do not conflict.

A method is also disclosed for detecting a policy conflict in a managed system, where the method includes creating a model of policy targets, the model capable of simulating the effects of applying policy rules to the policy targets, applying the action of the rules to the model, comparing at least two resulting macro states of the model with each other, and, in response to the at least two macro states differing, reporting a conflict.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The context of the present invention is a policy-driven system that includes multiple networked nodes. Such systems can include a communications infrastructure of equipment that is wired, wireless, or a combination thereof. The present invention detects conflicts between two instances of a PolicyRule by dividing conflict detection into a sequence of levels, with computationally simple, but possibly less conclusive steps at the start of the sequence and more probably conclusive, but more computationally complex steps at the end of the sequence. Advantageously, the sequence of levels leads to most conflict checks completing in the early computationally efficient steps of the sequence, resulting in a probabilistically low computational load.

A policy is typically defined as a set of rules. Each policy rule includes an event clause, a condition clause and an action clause. Upon triggering event(s), if the condition clause evaluates to TRUE, then the actions in the action clause are allowed to execute. If the condition clause evaluates to FALSE, then the actions in the action clause are not allowed to execute. The policy rule may also specify "otherwise" policy actions in the action clause to be executed when the condition clause evaluates to FALSE. Therefore, one definition of policy management is: the usage of policy rules to accomplish decisions.

Figure 1:
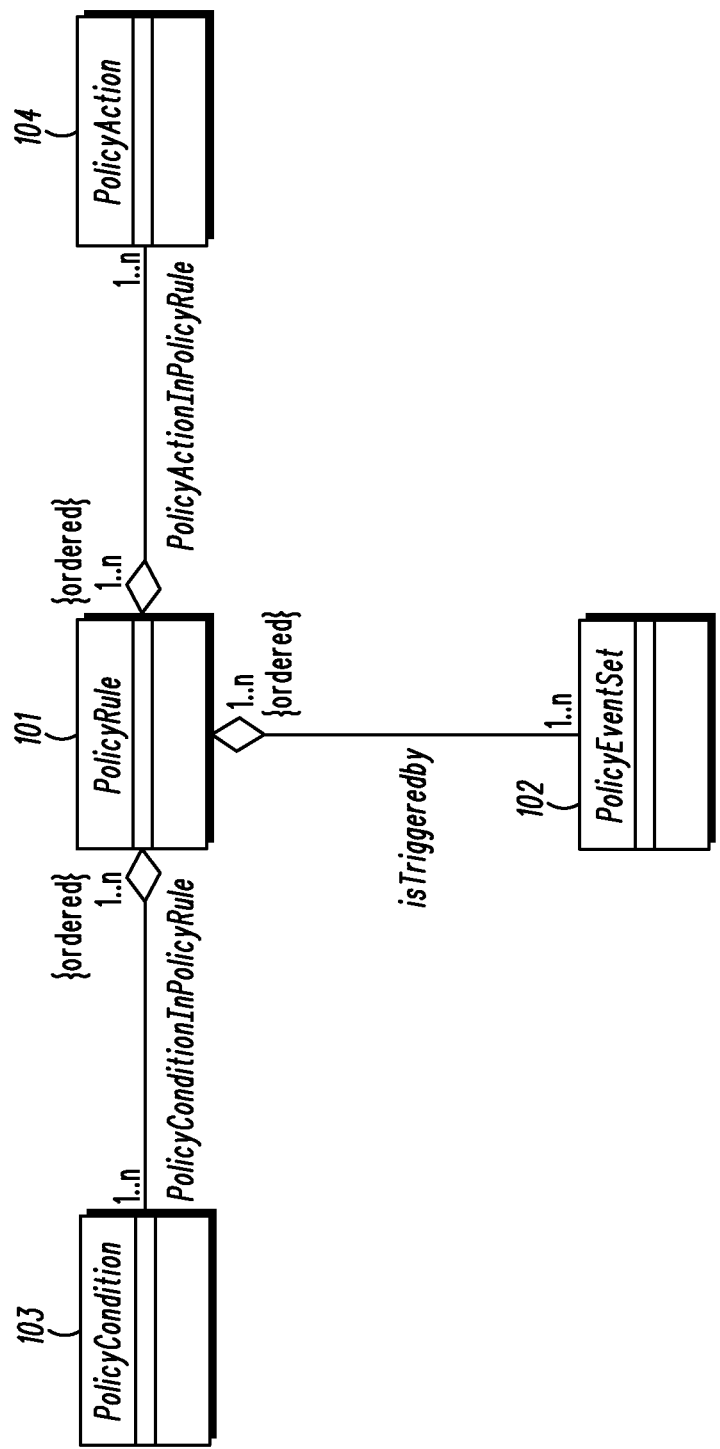
FIG. 1 is block diagram illustrating a policy rule structure, according to an embodiment of the present invention.

Policy is usually represented as a set of classes and relationships that define the semantics of the building blocks of representing policy. The fundamental unit of policy is a policy rule. FIG. 1 illustrates a model of a policy rule 101 in accordance with an embodiment of the present invention. The policy rule 101 includes one or more policy events 102, policy conditions 103, and policy actions 104. This Event/Condition/Action 3-tuple is a common definition of a policy rule in the art. FIG. 1 incorporates the simplified Directory Enabled Networks-new generation (DEN-ng) policy model as described in *Policy-Based Network Management*, John C. Strassner, Morgan Kaufmann Publishers, 2004—the contents of which are hereby incorporated by reference.

Figure 2:
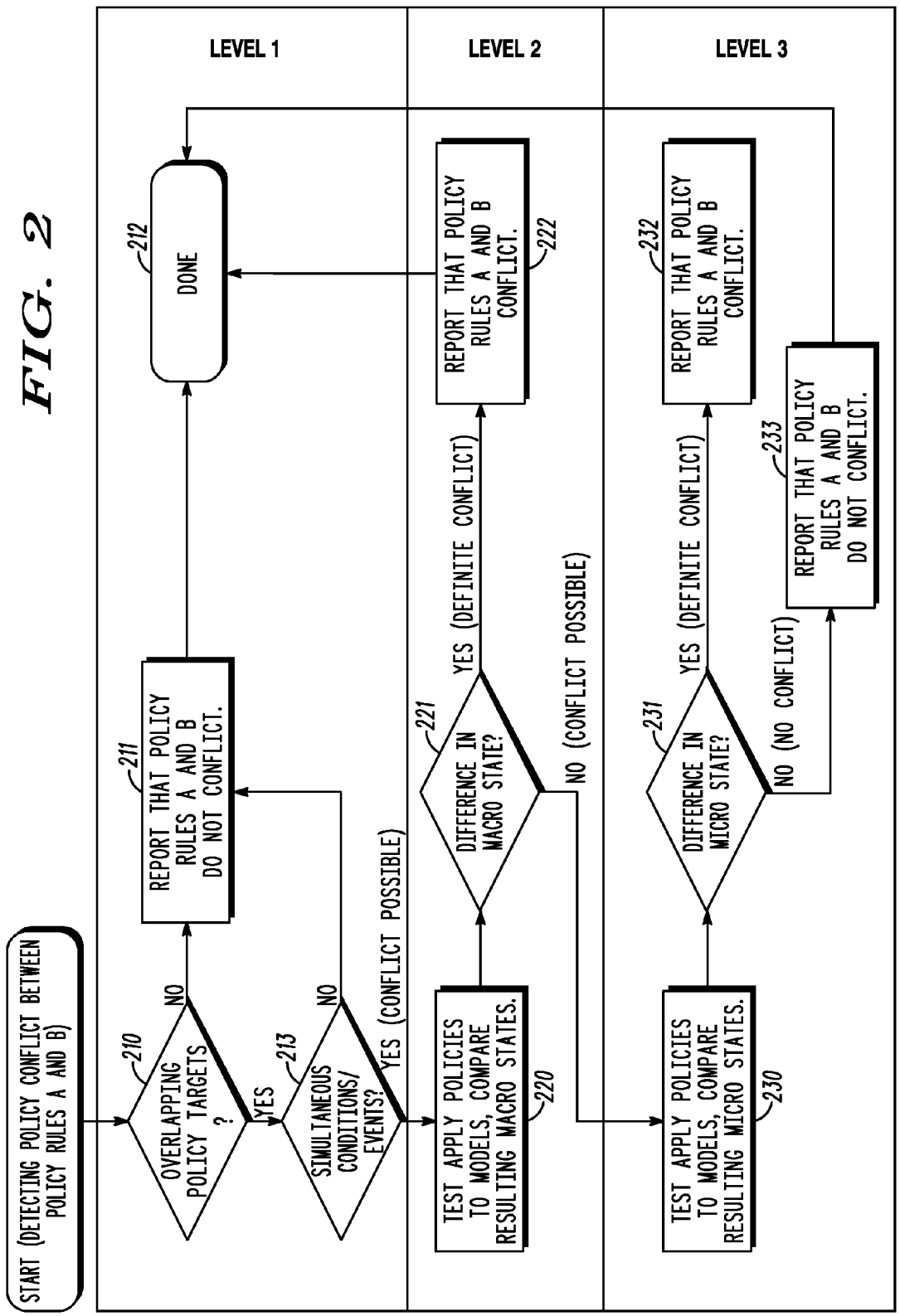
FIG. 2 is a process flow diagram of an N-level policy conflict detection sequence, according to an embodiment of the present invention.

FIG. 2 shows one example of an N-level policy conflict detection sequence according to an embodiment of the present invention. It should be noted that the three levels shown in FIG. 2 are simply exemplary. The present invention is not intended to be limited to any particular number of levels. In addition, other policy conflict detection methods could be substituted or added into the sequence. This sequence is for illustration and enablement of the present invention, but the invention is not so limited.

Level 1 of 3 in FIG. 2 (items 210, 211, and 212) involves the use of a policy conflict detection method. This method tests for overlapping PolicyTarget instances between the two PolicyRule instances. If no such overlapping PolicyTarget instances exist then, by Strassner's definition of policy conflict (see section 2.6.3 on page 68 of Strassner's Policy-Based Network Management), no conflict can exist between the rules. In particular, if there are no overlapping PolicyTarget instances, then the policy rules cannot "apply to the same set of managed objects" as required by the definition.

Level 1 is an example of a conflict elimination step; it can positively eliminate the possibility of policy conflicts between rules but it does not determine that a conflict actually exists. In the high-probability case of non-overlapping PolicyTarget instances between PolicyRule instances, the test is simple and fast and no further conflict testing is required since there can be no conflict without overlapping targets. The test is simple and fast because it is a test of overlap between PolicyTargets rather than a test of PolicyEvents and PolicyConditions, which are likely to be complex. Indeed, the test for overlap between PolicyTargets will often simplify into a test of equality (e.g. same configuration register in same router).

In the case that there are overlapping PolicyTarget instances, the example three-level detection process of FIG. 2 checks in step 213 that PolicyEvents and PolicyConditions are simultaneously active/satisfied. If not, there can be no conflict and the process reports in step 211 that no conflict exist and ends at step 212. If events and conditions are simultaneously active/satisfied, then conflict is possible and the process continues to level 2.

Level 2 of 3 in FIG. 2 (items 220, 221, and 222) is another policy conflict detection method. This level is more computationally intensive that level 1, but more authoritative at determining conflicts. In brief, this level uses models to apply the PolicyAction instances to the PolicyTarget instances and compares the ITU (International Telephone Union) standard X.731 "macro" states describing the states of PolicyTarget instances common to the two PolicyRules. The ITU X.731 standard is described in *Information technology—Open Systems Interconnection—Systems Management: State management function*, ISO/IEC 10164-3:1993, 1992, the contents of which are hereby incorporated by reference. There are relatively few parameters completely describing these macro states, making differences relatively easy to find. However, again, determining these resulting states requires more computational effort than level 1, entailing application of models of the PolicyTarget instances and their associated state machines in a simulated application of the PolicyActions. Level 2 is an example of a conflict discovery step; it can positively determine that a conflict exists, but it cannot assert that no conflicts exist between the given PolicyRule instances.

Note that the method of example level 2 would be applied for each overlapping PolicyTarget instance between the two PolicyRule instances being tested by embodiments of the present invention. This detail is omitted from FIG. 2 for the sake of simplicity. In some applications, it may be suitable to halt the method when a conflict between two PolicyRule instances is identified. In other applications, it may be desirable to determine all sources of conflict between two PolicyRule instances in order to aid in addressing the separate but related problem of policy conflict resolution.

This level in the N-level policy conflict detection method of the present invention relies on a high-level, "macro" state of a ManagedObject. Every managed entity in the system can be defined as being in one of these macro states at any given time. While many such macro states could be devised and used with the present invention, it is convenient to reference the ITU X.731 standard's macro states for the sake of the present discussion. These states are shown below.

In step 220 of level 2, policies are test applied to models of the system, i.e., the policies are not applied to that actual system. Note that the policies could be applied to real system(s) without departing from the teachings of the present invention, but this is not most likely way to test apply policies. The resulting macro states from the test application are compared in this step also. Then, in step 221, a determination is made as to whether there is a difference in the resulting macro states. If the answer is yes, then there is a conflict and it is reported, in step 222, that rules A and B conflict. The flow then moves to step 212 and stops since conflict has been authoritatively determined. If the determination of step 221 is no, it doesn't authoritatively mean that there is no conflict, although conflict could be said to be less likely at this point. Without authoritative determination of policy conflict, the process continues on to level 3.

Figure 3:
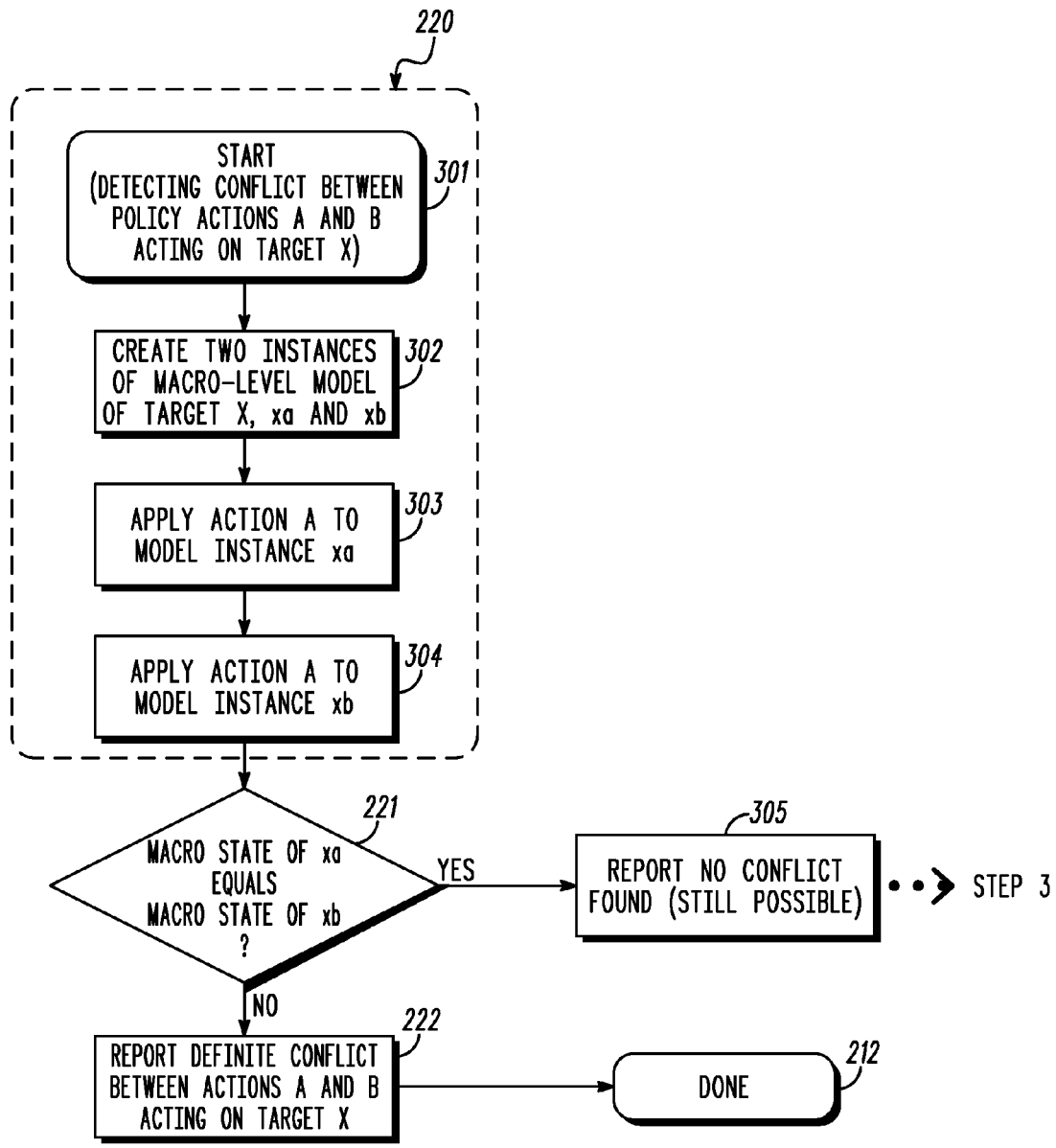
FIG. 3 is a process flow diagram of an intermediate level of the N-level policy conflict detection sequence of FIG. 2, according to an embodiment of the present invention.

FIG. 3 shows the overall process flow of level 2 in FIG. 2, according to one embodiment of the present invention. Step 220 of FIG. 2 is expanded in FIG. 3 to include steps 301-304.

The flow of FIG. 3 begins at step 301, where a conflict(s) between policy actions A and B acting on a target X are detected. In a following step, 302, models of target X are instantiated at the macro state level. That is, a simplified model of target X can be used. The initial state of these instances of the model may be, for example, an initial state, as target X would be configured in a given system which would lend itself to a priori conflict detection, or their present state in a running system, which would lend itself to real-time policy conflict detection. Note that the latter example is of significant use since conflicts may depend, in part, on the state of the target, which may change during the life of a system.

Steps 303 and 304 simulate application of the policy by employing simplified macro-level models of target X created in step 302. The simulation of application of the policy rules is much safer than actual application. Further, the use of simplified macro-level models reduces the computational complexity of these simulation steps.

The flow then moves to step 221, which compares the resulting macro states of the two model instances after the actions being tested are applied. The ITU X.731 standard "defines a systems management function which may be used by an application process in a centralized or decentralized management environment to interact for the purpose of systems management. This International Standard defines the state management function and consists of service and generic definitions. ITU X.731 provides a convenient example of macro states. The following provides information on this standard as it relates to the present invention.

Section 7.1 of the ITU X.731 standard defines the following generic X.731 state attributes:

Operability {enabled, disabled}: whether the device is physically installed and enabled;

Usage {idle, active, busy}: whether resource is actively being used by some system functionality; and Administration {locked, unlocked, shutting down}: permission to use or prohibition against using, controlled from the management plane.

These may be combined into a limited number of legal macro states. Every managed entity in the system can be defined as being in one of these states at any given time. The following are the possible combinations of values for the three state attributes:

Disabled, idle, locked: The resource is totally inoperable, it is not servicing any users and it is also administratively prohibited from use. To make it available for use, both management permission (an unlock operation) and some corrective action are necessary.

Enabled, idle, locked: The resource is partially or fully operable, it is not servicing any users but is administratively prohibited from use. To make it available for use, only management permission (an unlock operation) is required.

Enabled, active, shutting down: The resource is partially or fully operable and in use, but usage is administratively limited to current instances of use. For an additional user to gain access, management permission (an unlock operation) is required. Otherwise, when all current users have terminated their use of the resource, the managed object will automatically transit to the enabled, idle, locked state.

Enabled, busy, shutting down: The resource is partially or fully operable and in use, but usage is administratively limited to current instances of use; in addition, it has no spare capacity to provide for additional users. For an additional user to gain access, besides waiting for an existing user to terminate, management permission (an unlock operation) is also required. Otherwise, when all current users have terminated their use of the resource, the managed object will automatically transit to the enabled, idle, locked state.

Disabled, idle, unlocked: The resource is totally inoperable, it is servicing no users but it is not administratively prohibited from use. To make it available for use, some corrective action is required.

Enabled, idle, unlocked: The resource is partially or fully operable, it is not actually in use and is not administratively prohibited from use.

Enabled, active, unlocked: The resource is partially or fully operable, it is currently in use and is not administratively prohibited from use. It has sufficient spare capacity to provide for additional users simultaneously.

Enabled, busy, unlocked: The resource is partially or fully operable, it is currently in use and it is not administratively prohibited from use. Currently it has no spare capacity to provide for additional users. For an additional user to gain access, it is necessary to wait for an existing user to terminate or for some capacity increase to occur."

If the macro states of the two model instances XA and XB are not equal, a definite conflict exists between actions A and B acting on target X. This is reported in step 222 and the flow stops at step 212. However, if the macro states of the two model instances XA and XB are equal, there may still be a conflict, but it is not yet known. In step 305, a no conflict found message is reported out and the flow moves on to level 3 of FIG. 2.

In the event the macro state is the same when the Policy-Action instances of the two PolicyRule instances are applied to the rules' overlapping PolicyTarget instances, then Level 3 of FIG. 2 examines the micro state of the PolicyTarget instances. Where a macro state is a high-level state that is common to all entities, a micro state is low-level and only applies to certain groups of entities. Examples of micro states are configuration bits on a serial port, a motherboard with thermister chip where one state is normal and another is overheated, a port that is in use or not in use (e.g. cord plugged in or not), various degrees of traffic, and the like. Level 3 is the exhaustive comparison down to the granularity demanded by the policies in the PolicyRule instances in question. The state space of comparison is larger and therefore the computational complexity of this level is significantly larger.

Level 3 starts at block 230 where policies are test applied to models and their resulting micro states are compared. From this application of policies to the model, micro states result. A check is performed in step 231 to determine whether or not there is a difference in these resulting micro states. If there is no difference found, then it is authoritatively determined that no conflicts exist. In this event, the flow moves to step 233 where it is reported out that rules A and B do not conflict. The flow then moves to step 212 and stops. Alternatively, if at step 231 it was determined that there is a difference in the micro states, then it is authoritatively determined that conflict exists. In this case, the flow moves to step 232, where it is reported out that policy rules A and B do conflict. The flow then moves to step 212 and completes.

Note that one could skip levels 1 and 2 and proceed directly to level 3 in conflict detection. Doing so would result in deterministic conflict detection but would likely be at significantly higher computation cost than application of the present invention. For this reason, the N-step process of the present invention provides a strategy for finding conflicts that minimizes computational demand on a policy server running the inventive algorithms.

Figure 4:
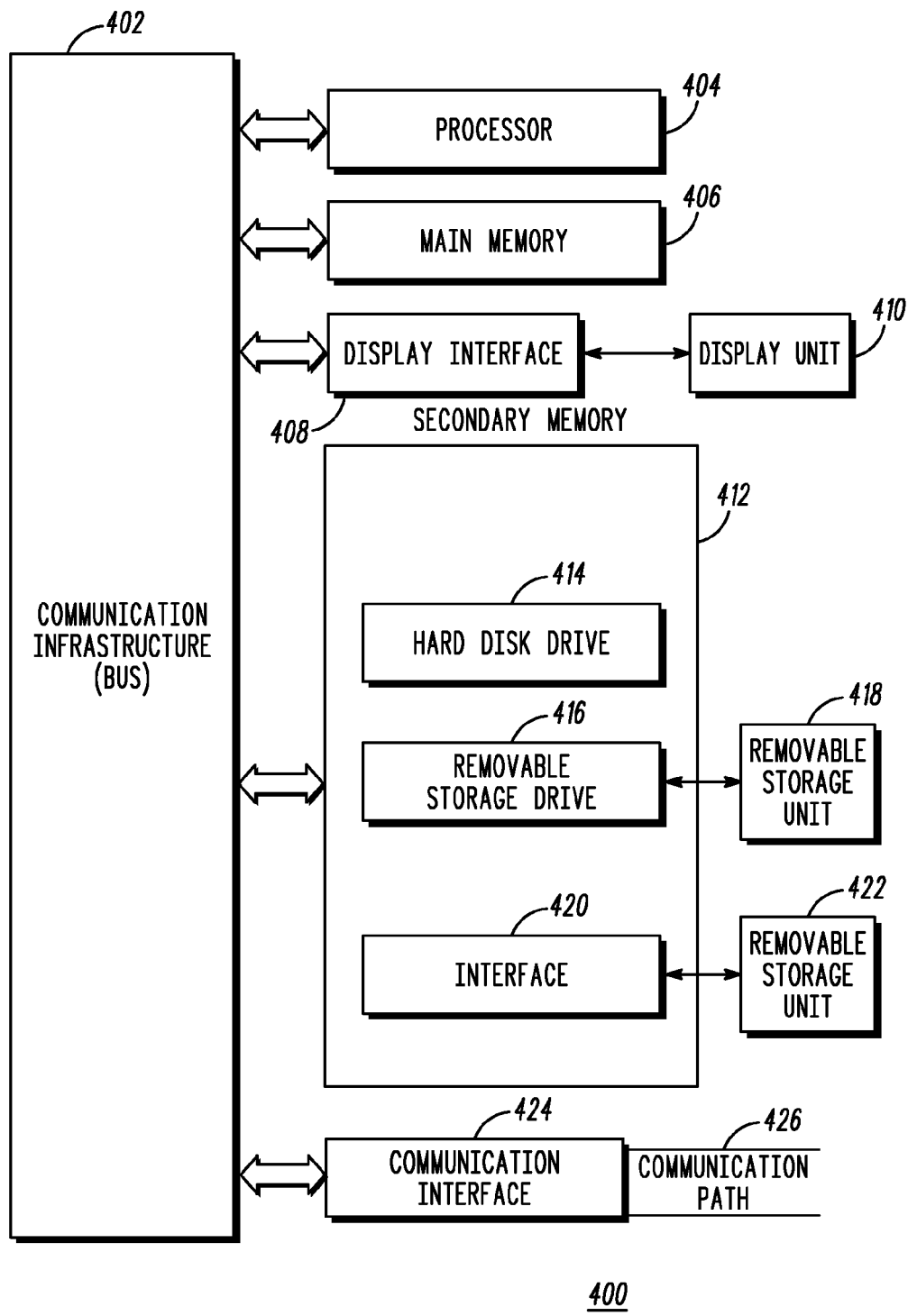
FIG. 4 is a high level block diagram of a policy server, according to an embodiment of the present invention.

FIG. 4 is a high level block diagram illustrating a detailed view of a computing system 400 useful for implementing a policy server according to embodiments of the present invention. The computing system 400 is based upon a suitably configured processing system adapted to implement an exemplary embodiment of the present invention. For example, a personal computer, workstation, or the like, may be used.

In one embodiment of the present invention, the computing system 400 includes one or more processors, such as processor 404. The processor 404 is connected to a communication infrastructure 402 (e.g., a communications bus, crossover bar, or network). Various software embodiments are described in terms of this exemplary computer system. After reading this description, it will become apparent to a person of ordinary skill in the relevant art(s) how to implement the invention using other computer systems and/or computer architectures.

The computing system 400 can include a display interface 408 that forwards graphics, text, and other data from the communication infrastructure 402 (or from a frame buffer) for display on the display unit 410. The computing system 400 also includes a main memory 406, preferably random access memory (RAM), and may also include a secondary memory 412 as well as various caches and auxiliary memory as are normally found in computer systems. The secondary memory 412 may include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a manner well known to those having ordinary skill in the art. Removable storage unit 418, represents a floppy disk, a compact disc, magnetic tape, optical disk, etc. which is read by and written to by removable storage drive 416. As will be appreciated, the removable storage unit 418 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer-readable information.

In alternative embodiments, the secondary memory 412 may include other similar means for allowing computer programs or other instructions to be loaded into the policy server. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computing system 400.

The computing system 400, in this example, includes a communications interface 424 that acts as an input and output and allows software and data to be transferred between the policy server and external devices or access points via a communications path 426. Examples of communications interface 424 may include a modem, a network interface (such as an Ethernet card), a communications port, a PCMCIA slot and card, etc. Software and data transferred via communications interface 424 are in the form of signals which may be, for example, electronic, electromagnetic, optical, or other signals capable of being received by communications interface 424. The signals are provided to communications interface 424 via a communications path (i.e., channel) 426. The channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 406 and secondary memory 412, removable storage drive 416, a hard disk installed in hard disk drive 414, and signals. The computer program products are means for providing software to the computer system. The computer readable medium allows the computer system to read data, instructions, messages or message packets, and other computer readable information from the computer readable medium.

Computer programs (also called computer control logic) are stored in main memory 406 and/or secondary memory 412. Computer programs may also be received via communications interface 424. Such computer programs, when executed, enable the computer system to perform the features of the present invention as discussed herein. In particular, the computer programs, when executed, enable the processor 404 to perform the features of the computer system.

The present invention, according to certain embodiments, provides a system and method for implementing multiple policy conflict detection methods. Embodiments of the invention are advantageous in that exhaustive policy conflict detection is performed with probabilistically low computational requirements. This is because few cases are likely to reach the exhaustive state simulation and checking in the final level. In addition, the present invention provides flexibility to incorporate multiple different policy conflict detection methods. E.g., overlapping target and macro state steps.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for detecting a policy conflict in a managed system, the method comprising:
performing a multiple-level policy conflict detection sequence comprising at least a first level analysis, a second level analysis, and a third level analysis, with each level analysis being less computationally complex than the next level, wherein the performing of the multiple-level policy conflict detection sequence comprises;
examining during the first level analysis, by a policy server computing system, a plurality of policy rules for overlapping policy targets;
in response to no policy target overlaps being determined, reporting, by the policy server computing system, that the plurality of policy rules do not conflict;
in response to determining that policy targets overlap, if a set of conditions and a set of events for the policy rules are not simultaneously satisfied, then reporting, by the policy server computing system, that there is no conflict in the plurality of policies;

in response to the conditions and events for the policy rules being simultaneously satisfied, the policy server computing system applying, during the second level analysis, the plurality of policy rules to at least one of a model or an actual instance of a real system and evaluating at least one resulting macro state to determine whether a policy conflict exists;

when the second level analysis fails to find a definite conflict in the plurality of policies, the policy server computing system applying, during the third level analysis, the plurality of policy rules to a system model and evaluating at least one resulting micro state to determine whether a policy conflict exists.

2. The method according to claim 1, wherein evaluating, during the second level analysis, the at least one resulting macro state to determine whether a policy conflict exists comprises:

comparing, by the policy server computing system, the one or more macro states that result from the applying of the plurality of policy rules; and in response to determining a difference between the at least two macro states, reporting, by the policy server computing system, that the plurality of policy rules conflict.

3. The method according to claim 2, wherein evaluating, during the third level analysis, the at least one resulting micro state to determine whether a policy conflict exists comprises:

comparing, by the policy server computing system, the micro states that result from the applying of the policy rules; and in response to determining a difference between the at least two micro states, reporting, by the policy server computing system, that the plurality of policy rules conflict.

4. The method according to claim 3 further comprising:

in response to determining that there is no difference between the at least two micro states, reporting, by the policy server computing system, that plurality of policy rules do not conflict.

* * * * *